United States Patent
Fratti et al.

(10) Patent No.: US 8,886,166 B2
(45) Date of Patent: Nov. 11, 2014

(54) SYSTEM TO IDENTIFY WHETHER A TEXT MESSAGE IS FROM A TRUSTED SOURCE

(75) Inventors: Roger A. Fratti, Mohnton, PA (US);
Brian L. Huber, Reading, PA (US);
Joseph M. Freund, Fogelsville, PA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 205 days.

(21) Appl. No.: 13/487,399

(22) Filed: Jun. 4, 2012

(65) Prior Publication Data
US 2013/0324085 A1 Dec. 5, 2013

(51) Int. Cl.
*H04M 1/68* (2006.01)

(52) U.S. Cl.
USPC ............ 455/411; 455/466; 455/518; 455/519; 455/418; 455/41.2

(58) Field of Classification Search
USPC ......... 455/410–411, 517–519, 566, 466, 458, 455/575.1–575.9; 713/169, 170, 171
See application file for complete search history.

(56) References Cited

U.S. PATENT DOCUMENTS

| | | | | |
|---|---|---|---|---|
| 4,349,695 A | | 9/1982 | Morgan et al. | 178/22.08 |
| 5,226,079 A | * | 7/1993 | Holloway | 713/177 |
| 5,420,924 A | * | 5/1995 | Berson et al. | 713/186 |
| 6,732,144 B1 | * | 5/2004 | Kizu et al. | 709/203 |
| 6,741,851 B1 | * | 5/2004 | Lee et al. | 455/410 |
| 7,366,901 B2 | * | 4/2008 | Hapamas et al. | 713/168 |
| 7,433,678 B2 | * | 10/2008 | Beckers | 455/411 |
| 7,477,889 B2 | | 1/2009 | Kim | 455/411 |
| 8,036,707 B2 | * | 10/2011 | Kumar | 455/558 |
| 8,126,971 B2 | | 2/2012 | Shuster | 709/206 |
| 8,140,863 B2 | | 3/2012 | Brown et al. | 713/193 |
| 8,144,006 B2 | | 3/2012 | Thomas | 340/539.1 |
| 8,170,203 B2 | | 5/2012 | Ghouti et al. | 380/28 |
| 8,171,292 B2 | | 5/2012 | Brown et al. | 713/171 |
| 8,171,563 B2 | | 5/2012 | Pauker et al. | 726/27 |
| 8,176,135 B2 | | 5/2012 | Lau et al. | 709/206 |
| 8,195,213 B2 | * | 6/2012 | Maggenti et al. | 455/518 |
| 8,200,192 B2 | * | 6/2012 | Hsu et al. | 455/411 |
| 8,385,824 B2 | * | 2/2013 | Bakshi et al. | 455/41.2 |
| 8,798,610 B2 | * | 8/2014 | Prakash et al. | 455/418 |
| 2002/0058502 A1 | * | 5/2002 | Stanforth | 455/422 |
| 2003/0129964 A1 | * | 7/2003 | Kohinata et al. | 455/411 |
| 2005/0096009 A1 | * | 5/2005 | Ackley | 455/405 |
| 2005/0170812 A1 | | 8/2005 | Kim | 455/411 |
| 2008/0101578 A1 | * | 5/2008 | Barros et al. | 379/211.02 |
| 2008/0307226 A1 | | 12/2008 | Chow et al. | 713/175 |
| 2008/0320577 A1 | * | 12/2008 | Larduinat | 726/9 |
| 2009/0047929 A1 | * | 2/2009 | Chesnutt et al. | 455/411 |
| 2010/0075628 A1 | | 3/2010 | Ye | 455/404.2 |
| 2010/0257352 A1 | | 10/2010 | Errico | 713/151 |
| 2012/0084842 A1 | | 4/2012 | Whitmyer, Jr. | 726/4 |
| 2012/0088484 A1 | | 4/2012 | Koraichi et al. | 455/418 |
| 2012/0204032 A1 | * | 8/2012 | Wilkins et al. | 713/170 |
| 2013/0080763 A1 | * | 3/2013 | Lee et al. | 713/150 |
| 2014/0162598 A1 | * | 6/2014 | Villa-Real | 455/411 |

* cited by examiner

*Primary Examiner* — Sharad Rampuria
(74) *Attorney, Agent, or Firm* — Christopher P. Maiorana, PC

(57) ABSTRACT

The present invention concerns an apparatus comprising a first module and a second module. The first module may be configured to send a text message over a wireless network in response to one or more user keystrokes. The first module may generate a body of the text message and a security key to be transmitted along with the body of the text message. The second module may be configured to receive the body of the text message and the security key over the wireless network. The second module compares the security key to a set of known security keys to determine a match. A match indicates whether the text message was generated from a known sender. The first and second modules may be implemented as part of a portable device.

20 Claims, 5 Drawing Sheets

US 8,886,166 B2

SYSTEM TO IDENTIFY WHETHER A TEXT MESSAGE IS FROM A TRUSTED SOURCE

FIELD OF THE INVENTION

The present invention relates to text messaging generally and, more particularly, to a method and/or apparatus to identify whether a text message is from a trusted source.

BACKGROUND OF THE INVENTION

With conventional text messaging systems, an individual composing a text message on a first device can only initiate the transmission of an un-verified (or un-validated) text message. Another individual receiving the text message on a second device can only receive the un-verified (or un-validated) text message.

It would be desirable to implement a text messaging system to identify whether a text message is from a trusted source to improved security.

SUMMARY OF THE INVENTION

The present invention concerns an apparatus comprising a first module and a second module. The first module may be configured to send a text message over a wireless network in response to one or more user keystrokes. The first module may generate a body of the text message and a security key to be transmitted along with the body of the text message. The second module may be configured to receive the body of the text message and the security key over the wireless network. The second module compares the security key to a set of known security keys to determine a match. A match indicates whether the text message was generated from a known sender. The first and second modules may be implemented as part of a portable device.

The objects, features and advantages of the present invention include providing a text messaging system that may (i) provide security, (ii) identify whether a text message was generated from a known sender, (iii) operate using a firmware update on a conventional phone, (iv) be implemented without updating the cellular network infrastructure, (v) be implemented as an add-on app on a smartphone and/or (iv) be easy and/or convenient to use.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
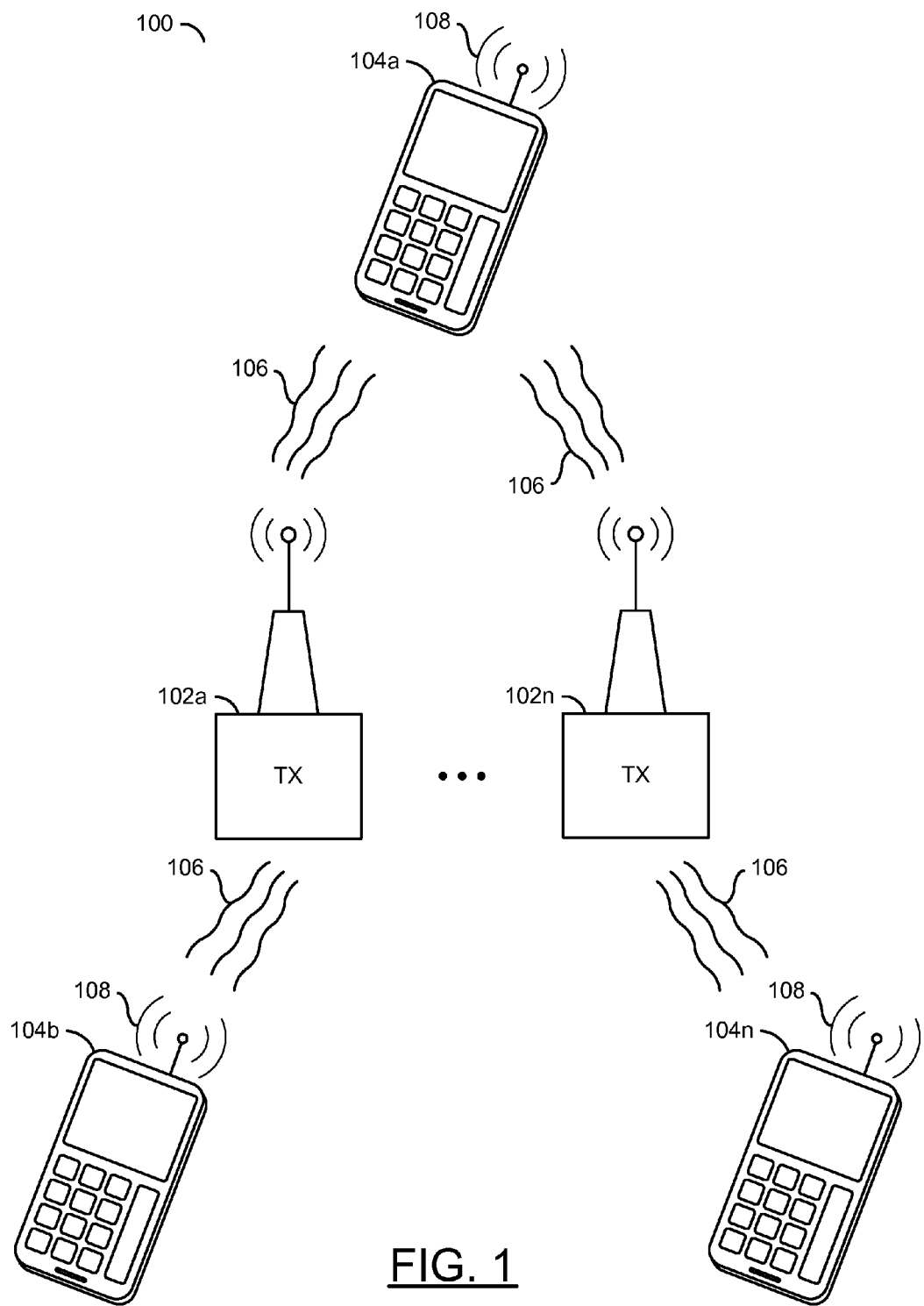
FIG. 1 is a block diagram of a context of the invention.

Referring to FIG. 1, a block diagram of a system 100 is shown in accordance with an embodiment of the present invention. The system 100 generally comprises a number of cellular towers 102a-102n and a number of cellular devices 104a-104n. The cellular towers 102a-102n may provide a wireless infrastructure. The cellular devices 104a-104n may each include an antenna 108. A number of wireless transmissions 106 are shown between the cellular telephones 104a-104n and the cellular towers 102a-102n. An individual (or user) may operate one of the cellular devices 104a-104n to initiate text messages. Another one (or more) of the cellular devices 104a-104n may receive and authenticate the text message.

The towers 102a-102n generically show a cellular infrastructure. The particular type of cellular infrastructure may be varied to meet the design criteria of a particular implementation. For example, cellular infrastructures are normally upgraded on a regular basis (e.g., 3G, 4G, etc.). The 3G/4G nomenclature generally refers to the particular generation of the cellular infrastructure. Within each generation of cellular infrastructure, various speeds may be implemented. Additionally, various transmission protocols may be implemented (e.g., CDMA, TDMA, GSM, etc.). The system 100 may operate independently of the particular generation and/or speed of the cellular infrastructure implemented.

Figure 2:
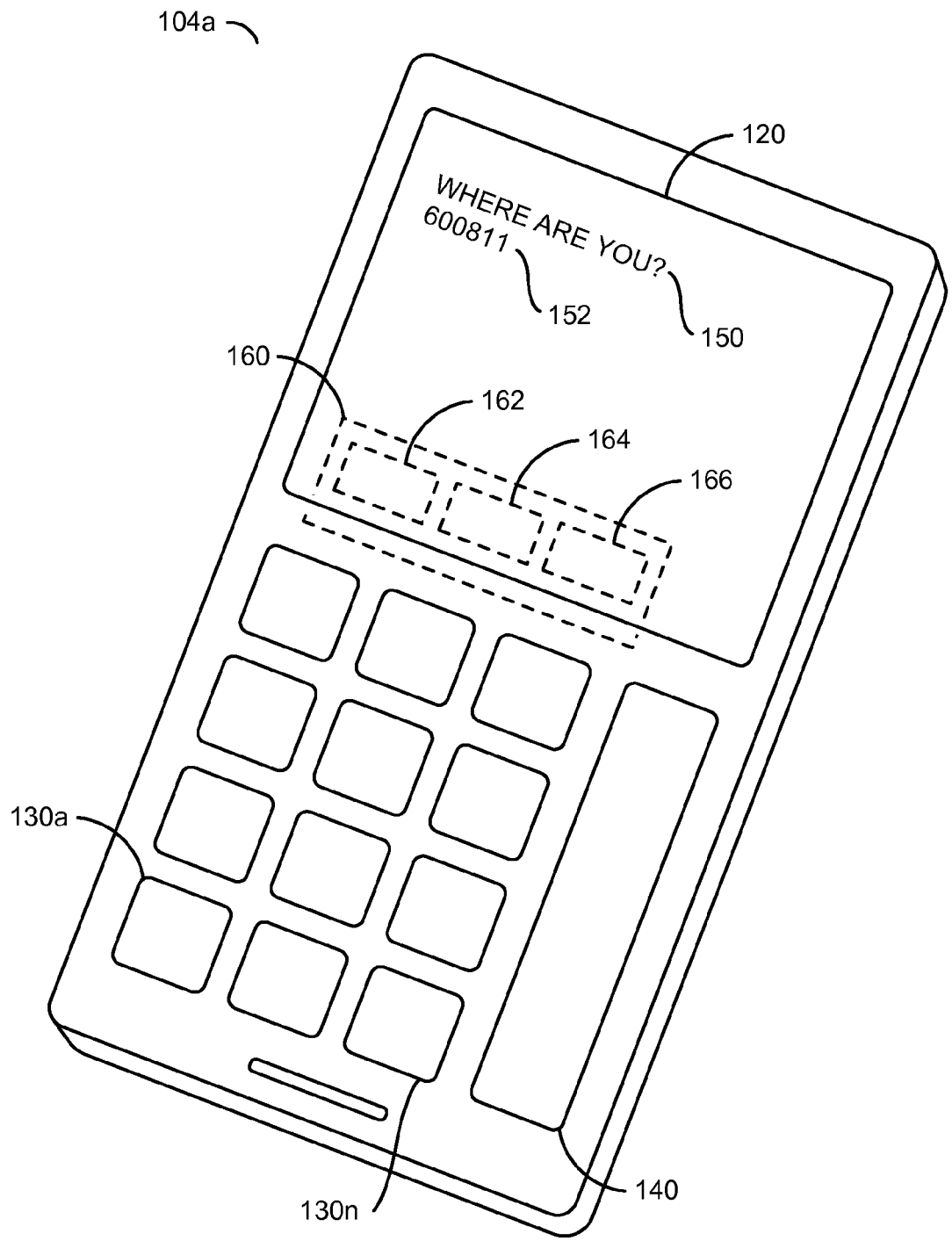
FIG. 2 is a more detailed diagram of one of the cellular phones of FIG. 1.

Referring to FIG. 2, a more detailed diagram of one of the cellular phones (e.g., 104a) is shown. The cellular phone 104a generally comprises a display 120, a number of input buttons 130a-130n and a button 140. The button 140 may be implemented as a dedicated button. The display 120 is shown having a text message (e.g., "WHERE ARE YOU?") labeled as item 150 and a security code (or key) (e.g., "600811") labeled as 152. The buttons 130a-130n may be used to type in the text message 150. The button 140 may be used to enter the security code 152. For example, the button 140 may be implemented to provide a single touch feature for entering each of the digits of the security code 152. However, in another example, the security code 152 may be entered by pressing the buttons 130a-130n one number at a time. For example, the phone 104a may be implemented to program the button 140 to provide a single touch to enter the security code 152. However, in a phone 104a that does not allow programmability of individual buttons, the code 152 may be individually programmed. The buttons 130a-130n, the button and/or the antenna 108 may be part of a sending module configured to send the text message 150 and the security code 152.

In one example, the security code 152 may be implemented as an identify friend/foe (IFF) code. Such an IFF code may be useful for a positive identification of the origin of the text message 150. However, the particular type of code implemented may be varied to meet the design criteria of a particular implementation. While FIG. 2 shows a simple numeric code, an alpha/numeric code may also be implemented. Additionally, depending on the complexity and/or level of security desired, the security code may be implemented as a complex code that goes beyond an alpha/numeric code. For example, a number of hexadecimal characters may be implemented. Additionally, a different color font, an emoticon, a different background color or background image, font style, etc. may be used to distinguish the security key. A font style, an ASCII code, a specific font (e.g., Wingding, Arial, etc.), an emotion picture, etc. may all be used to make the security key.

A two part decoding may also be implemented. For example, if one line of the security code 152 is the name of a particular user and shown in a particular color (or other type of distinctive feature—bold, italics, etc.), a user using one of the receiving devices 104a-104n may initiate a second level of decoding. Additionally, other types of codes may include non-character items such as a fingerprint, an audio prompt, a series of vibrations, etc. For example, a secret word may be shared between two users in the system 100.

In general, the cellular devices 104a-104n may be implemented as portable devices. For example, the devices 104a-104n may be implemented as battery powered devices that may be carried by an individual (or end user), without being physically attached to the cellular infrastructure 102a-102n and/or other land based servers through hard wires. By implementing the end user devices 104a-104n as portable devices, physical constraints from being tied to the cellular infrastructure 102a-102n may be eliminated.

The device 104a may also include a circuitry portion 160. The circuitry portion 160 may include a block (or circuit) 162, a block (or circuit) 164 and a block (or circuit) 166. In one example, the circuit 162 may be implemented as a processor. The circuit 164 may be implemented as a memory. In one example, the circuit 166 may be implemented as a lookup table. The particular number of circuits 162, 164 and/or 166 implemented may be varied to meet the design criteria of a particular implementation. In general, the processor 162 may be configured to read and/or execute computer instructions stored and/or retrieved from the memory 164. The lookup table 166 may be implemented as part of the memory 164 or as a stand-alone module. The lookup table 166 may be implemented to store a number of security codes used to compare to the security code 152. The lookup table 166 may be updatable by a user and/or update software to accommodate newly trusted security codes 152. To provide security, a number of measures may be used when updating the lookup table 166. For example, an update may only be allowed in the presence of a "witness" and/or the input of a secret code specific to the witness. In one example, if a parent has a child, and the child would like to change the secret code 152, the child would only be permitted to make the change in the presence of a parent or designated guardian. The guardian would witness the change and/or a code to verify and complete the change. The witness process would not necessarily have to take place face-to-face, but may also be done via a secure electronic interface/transaction connection. While a witness type protocol has been described, other procedures may be implemented to ensure that the lookup table 166 is only updated by trusted sources.

Figure 3:
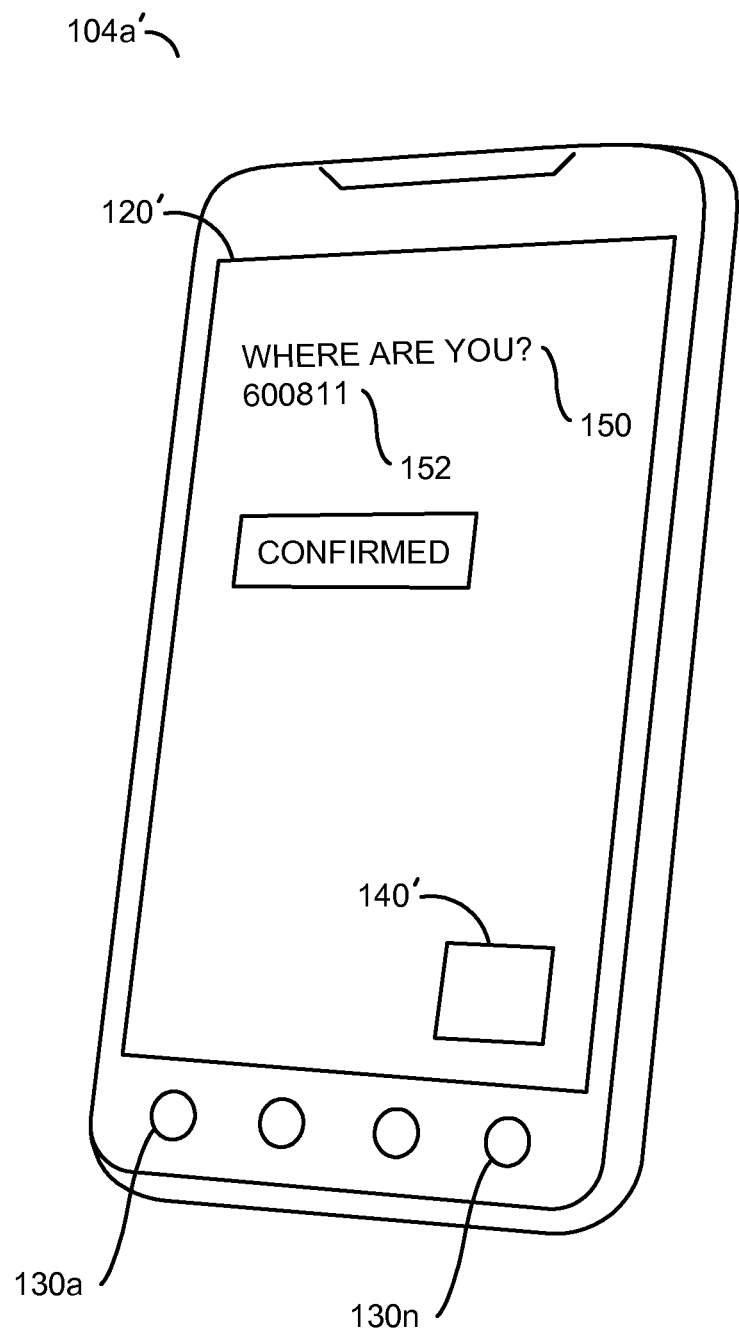
FIG. 3 is a diagram of an alternate implementation of a cellular phone.

Referring to FIG. 3, a diagram of a phone 104a' is shown. The cellular phone 104a' may be implemented as a "smartphone". The cellular smart phone 104a' may be implemented with a touch screen 120' and a number of buttons 130a-130n. The cellular phone 104a' may implement a software "app" (or application) that may be used to either generate the security code 152 or to authenticate the security code 152. The software app may be used to implement a soft button 140' and may be used for a one touch programming of the security code 152.

Figure 4:
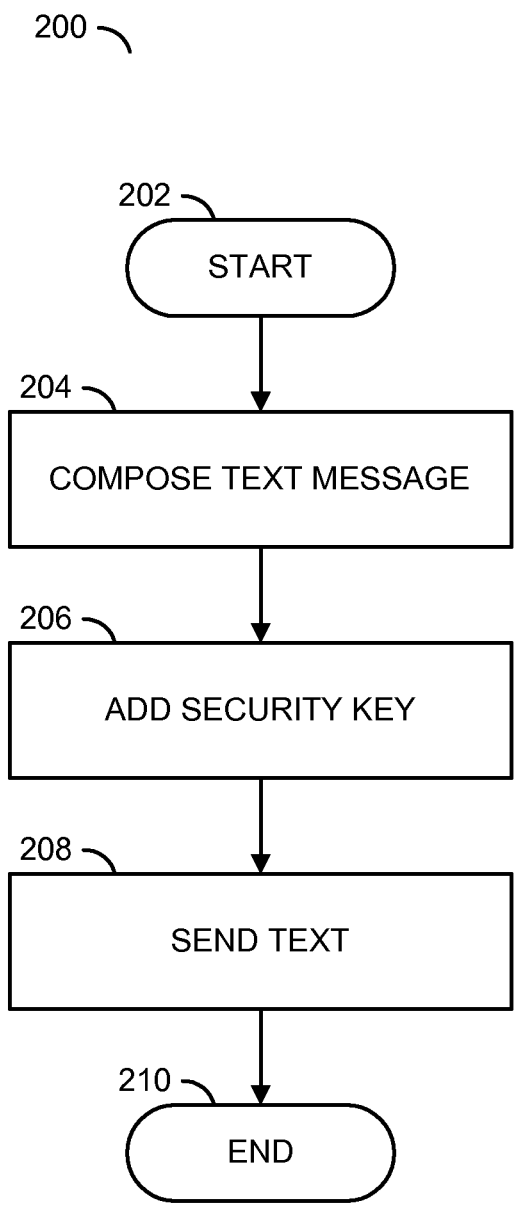
FIG. 4 is a flow diagram illustrating a process used to generate a security key.

Referring to FIG. 4, a diagram of a method (or a process) 200 is shown. The method 200 generally comprises a step (or state) 202, a step (or state) 204, a step (or state) 206, a step (or state) 208 and a step (or state) 210. The step 202 may be a start step. The step 204 may be a "composed text message" step. The step 206 may be an "add security key" step. The step 208 may be a "send text" step. The step 210 may be an end step. The process 200 may be used to compose the text message 150 along with the security code 152.

Figure 5:
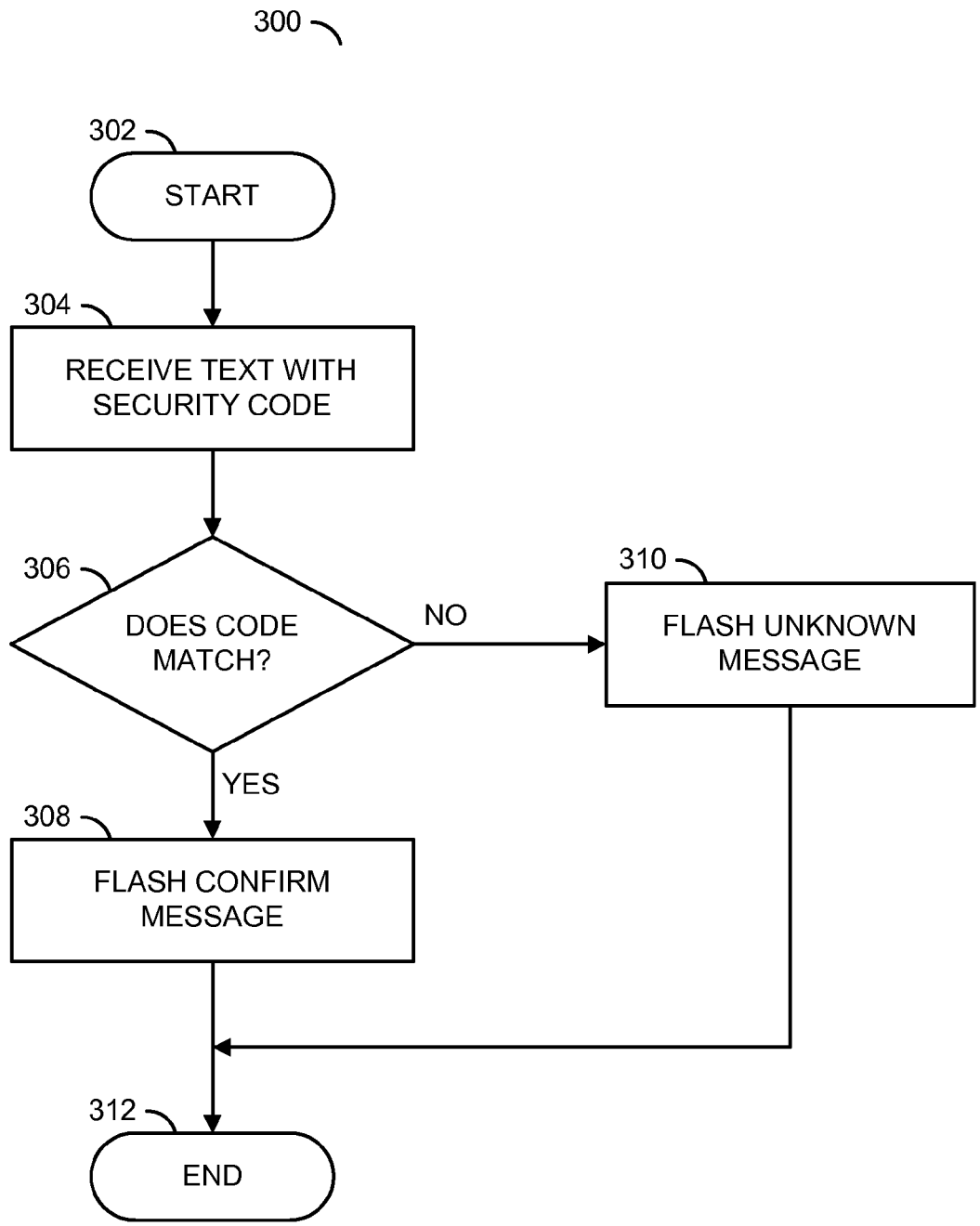
FIG. 5 is a flow diagram illustrating a process used to authenticate the security key.

Referring to FIG. 5, a method (or process) 300 is shown. This method 300 generally comprises a step (or state) 302, a step (or state) 304, a step (or state) 306, a step (or state) 308, a step (or state) 310 and a step (or state) 312. The step 302 may be a start step. The step 304 may be a received text with security code step. The step 306 may be a decision step. The step 306 may determine whether a code matches a number of codes known to a recipient device. If the code matches, the method 300 may move to the state 308. If not, the method 300 may move to the state 310. The state 308 flashes a "CONFIRM" message to the display 120. The step 310 flashes a "UNKNOWN" message to the display 120. The step 312 is an end step.

A number of known security keys may be programmed into the recipient device 104a prior to receiving the text message 150. Such an implementation may allow a number of security keys 152 to be authenticated using a number of known systems prior to sending a text message.

The system 100 may provide a system or method to authenticate a message. The security code 152 may be implemented as an IFF code (or key) to be transmitted with text message 150. The dedicated key 140 may be used as a special handset key pre-identified as the security key 152 (e.g., a 7 digit code in one example). The user defined security code 152 may be created and assigned to the dedicated key 140. A text message may be entered in one of the sending handsets 104a-104n. The dedicated key 140 is pressed at the end of text message before message is sent. The text message 150 may be visible on sending handset screen 120, but the security key 152 does not need to be displayed after the dedicated key 140 is pressed. The text message 150 is sent by one of the handsets 104a-104n and received by another handset 104a-104n. The handset 104a-104n receiving the security key 152 may implement software to look for the security code 152 in an incoming text message.

If the security code 152 is detected, software in one of the receiving handsets 104a-104n may interpret the security code 152 to determine if the security code 152 is "recognized" by the receiving handset. The software application and/or the network 108 may be part of a receiving module. The security code 152 may be coordinated by "families" of handset manufacturers. If the security code 152 is "recognized" by the receiving handset, the "recognized" security code 152 is displayed on the/a receiving handset screen, and the indicator light is illuminated (green in this example).

If the security code 152 is NOT "recognized" by the receiving handset, the FALSE security code 152 is normally displayed on the receiving handset screen in offset text and the indicator light is illuminated in an alternative color (red is a logical choice). Based on the receiving handset security code 152 indications (e.g., screen and indicator light, etc.), the receiving handset user can determine validity of the received text message 150.

The system 100 may implement a determination of whether a message 150 is authentic at one of the end devices 104a-104n. The system 100 removes authentication from the cellular infrastructure. By having the authentication on one of the end devices 104a-104n, an additional level of security may be implemented for each user, since the servers in the cellular infrastructure are not part of the security loop. For example, if a security breach occurred on one of the servers of the cellular infrastructure, the security for all users would potentially be in jeopardy. By implementing authentication on one of the end devices 104a-104n, breaches in the security of the cellular infrastructure may be eliminated.

The functions performed by the diagrams of FIG. 4 and FIG. 5 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROM (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

While the invention has been particularly shown and described with reference to the preferred embodiments thereof, it will be understood by those skilled in the art that various changes in form and details may be made without departing from the scope of the invention.

The invention claimed is:

1. A system comprising:
    a first handset having a first module configured to send a text message over a wireless network in response to one or more user keystrokes, wherein said first module generates a body of said text message and a security key to be transmitted and displayed along with said body of said text message; and
    a second handset having a second module configured to receive said body of said text message and said security key over said wireless network, wherein (A) said second module compares said transmitted security key to a set of known security keys previously stored in said second module to determine a match, (B) said match indicates whether said text message was generated from a known sender, and (C) said second handset is configured to display a prompt indicating said text message has been authenticated if said match occurs.

2. The system according to claim 1, wherein said security key is generated by pressing a dedicated button on said first handset.

3. The system according to claim 2, wherein said dedicated button comprises a software button on a touchscreen.

4. The system according to claim 2, wherein said dedicated button comprises a hard button, with a description in a display.

5. The system according to claim 1, wherein said security key is programmable.

6. The system according to claim 1, wherein said security key comprises a plurality of digits.

7. The system according to claim 1, wherein said wireless network always transmits said message to a receiving device implementing said second module.

8. The system according to claim 1, wherein said system is implemented without modifying an existing wireless infrastructure.

9. The system according to claim 1, wherein said wireless network comprises a cellular network.

10. The system according to claim 1, wherein said first handset and said second handset are implemented separately from said wireless network.

11. The system according to claim 1, wherein said known security keys stored in said second handset are configured to be updated periodically.

12. The system according to claim 1, wherein said second module compares said transmitted security key to said set of known security keys using a software app running on a processor of said second handset.

13. The system according to claim 12, wherein said software app comprises a set of computer executable instructions running on said processor of said second handset.

14. The system according to claim 1, wherein said transmitted security key is compared with a number of security keys stored in a lookup table of said second handset.

15. The system according to claim 1, wherein said security key is generated by pressing a dedicated button on said first handset that is separate from a keypad used to generate the text of said body of said text message.

16. The system according to claim 2, wherein said dedicated button on said first handset is separate from a keypad used to generate the text of said body of said text message.

17. A system comprising:
    means for sending a text message over a wireless network in response to one or more user keystrokes having a first module, wherein said first module generates (i) a body of said text message and (ii) a security key to be transmitted and displayed along with said body of said text message; and
    means for receiving said body of said text message and said security key over said wireless network by a second module, wherein (A) said second module compares said transmitted security key to a set of known security keys previously stored in said second module to determine a match, (B) said match indicates whether said text message was generated from a known sender and (C) said means for sending and said means for receiving are part of a portable device, and (D) said means for receiving is configured to display a prompt indicating said text message has been authenticated if said match occurs.

18. A method for authenticating a source of a text message, comprising the steps of:
   (A) sending a text message over a wireless network in response to one or more user keystrokes, wherein a module in a first handset generates a body of said text message and a security key to be transmitted and displayed along with said body of said text message;
   (B) receiving said body of said text message and said security key over said wireless network by a second handset;
   (C) comparing said received security key to a set of known security keys previously stored in said second handset to determine a match;
   (D) indicating whether said text message was generated from a known sender; and
   (E) displaying a prompt indicating said text message has been authenticated if said match occurs.

19. The system according to claim 17, wherein said security key is generated by pressing a dedicated button on said means for sending.

20. The apparatus according to claim 19, wherein said dedicated button on said means for sending is separate from a keypad used to generate the text of said body of said text message.

* * * * *